United States Patent Office 3,543,578
Patented Dec. 1, 1970

3,543,578
FLOW METERING SYSTEM
Robert W. Sampson, Arlington Heights, Ill., assignor to Universal Oil Products Company, Des Plaines, Ill., a corporation of Delaware
Filed Feb. 26, 1968, Ser. No. 708,257
Int. Cl. G01f 1/00
U.S. Cl. 73—204
2 Claims

ABSTRACT OF THE DISCLOSURE

Flow metering system particularly adaptable for measuring relatively small flow rates of fluid flow within a conduit. The system utilizes a dual set of energy sensors for measuring the rate at which an externally induced energy source is applied to the sensors. The output signals from each set of sensors are compared and correlated with the flow rate of the fluid in the conduit. Preferably, the energy input is thermal in nature and the dual set of sensors are devices for receiving thermal information along the downstream path of the flowing fluid.

BACKGROUND OF THE INVENTION

The present invention relates to a flow metering system. It particularly relates to a system for measuring the rate of flow of a fluid medium, such as a liquid, by determining the rate of externally induced energy flow within the conduit carrying the fluid to be metered.

It is known in the art that various instruments are satisfactory for the determination of fluid flow within a carrier device. Generally, these instruments include head flow meters, area flow meters, positive displacement meters, weirs and flumes, and mass and magnetic flow meters. For use in the petroleum and chemical industries of commercial size, either the head flow meter or positive displacement meter is frequently selected. The head flow meter requires the production of some form of restriction in the flow line to produce a head, with a secondary element connected to the differential head for correlating the head developed with flow rate. Such a prior art restriction would include orifice assemblies of various designs.

However, in service for the measurement of relatively small flow quantities, such as would be used in laboratory or pilot plant operations, the design of head and/or positive displacement flow meters presents unique problems. By far the most prevalent problem in the use of orifice assemblies for the measurement of relatively small flow rates is that the design of the orifice edge with respect to orifice diameter is particularly critical and very little experimental work has been performed on these designs to permit widespread use with satisfactory results. In addition, the Reynolds Numbers encountered in laboratory or pilot plant operations are frequently at the extremely low range thereby placing an orifice assembly in a relatively unstable environment, such that the coefficient of discharge is significantly affected by relatively small changes in Reynolds Number.

Recently, the petroleum industry has become interested in upgrading relatively heavy petroleum oils commonly called "black oils" into more valuable products, such as gasoline and fuel oil, through such means as hypdrocracking. Therefore, the experimental development work such as pilot plant operation has been handling fluids which are notably black in color, higly viscous, and in some instances, unusually corrosive. In order to overcome the above mentioned deficiencies in orifice assembly measuring devices, those skilled in the art have frequently used displacement-type devices which operate on the manometric principle, e.g. the principle of displacing, for example, mercury in a glass container and observing the time required for the mercury to rise to a predetermined level. In the handling of black oils, however, the utilization of visual observations in a glass device becomes virtually impossible due to, among other things, the fact that the black oil so clouds the glass surface that the level of, for example, mercury, cannot be accurately observed.

It has also been known by those skilled in the art that devices could be constructed for measuring the flow of fluid materials which do not require direct contact with the fluid. One such prior art device is illustrated in U.S. Patent No. 2,446,283 which discusses the thermoelectric principle of an electric current being set-up between junctions of two dissimilar metals with one junction being at a higher temperature than the other junction. Therefore, the patentees disclose that by heating one of the junctions between the wire and tube or conduit, a voltage reading would be obtained on, for example, a millivolt meter on the circuit. The reading of the millivolt meter could then be calibrated to the flow of a given fluid material through the conduit. However, this prior art device has the objection in that it is apparently only reasonably accurate and thereby becomes almost completely unsuitable for carrying fluids in conduits of larger diameter than in a tubing. In addition, the device cannot be satisfactorily utilized on materials which are at relatively high temperatures.

More recently, another prior art device was disclosed in U.S. Patent No. 3,097,526 which utilizes, in alternating manner, ultrasonic waves within the fluid to be measured in order to determine the flow rate of such fluid relative to the conduit within which the fluid is flowing. This device propagates an ultrasonic wave in cocurrent fashion with the flowing fluid and then ultimately propagates ultrasonic waves in counter-current fashion with the flowing fluid. The output signal from the sensing devices for pick-up of the ultrasonic wave front is then correlated with the rate of flow of the fluid. However, the patented method is totally dependent upon the conduction characteristics of the flowing fluid for ultrasonic waves in order for accurate flow rates to be determined. Therefore, if there is any significant change in the composition of the fluid to be measured, such prior art ultrasonic devices must be recalibrated for the change in composition. Such recalibration requirements, of course, render this ultrasonic device relatively inflexible for widespread use in petroleum and chemical processing plants which do handle fluids which frequently change in composition over a relatively short span of time.

SUMMARY OF THE INVENTION

Therefore, it is an object of this invention to provide an improved flow metering system.

It is another object of this invention to provide an improved flow metering system for use in measuring fluid flow rates in a relatively low range.

It is still another object of this invention to provide an improved flow metering system which operates in a facile manner and which can be used within a composition changing system without frequent recalibration.

Thus, according to the present invention there is provided an improved flow metering system comprising, in combination, conduit for the passage of fluid therethrough; energy inducing means connected to said conduit; first plural energy sensors spaced along the inner wall of said conduit in a manner to measure said induced energy flow between said first sensors; second plural energy sensors spaced substantially along the axis of said conduit in a manner to measure said induced energy flow between said second sensors; time determining means cooperatively connected to said first and second sensors for determining the respective time for said induced energy flow between said sensors; and, readout means for representing the rate of flow of fluid.

Another embodiment of the invention includes the system hereinabove wherein said readout means includes counting means and wherein said first and second sensors include polarity sensors.

A still further embodiment of the invention includes the system hereinabove wherein said energy inducing means comprises thermal means.

The essence of the present invention as seen from the embodiments thereof herein referred to includes the inducement of energy into the flowing body of fluid and having the wave front of the induced energy being picked up by spaced sensors which are critically placed within the conduit containing the fluid to be metered. It is an essential part of this invention for at least one set of energy sensing devices to be placed at the wall of the conduit where for all practical purposes the flow of fluid can be deemed zero. It is another essential feature of this invention that at least another set of energy sensing devices be placed within the main stream of the flowing fluid, preferably, along the axis of the conduit so that the energy wave front at the sensing point will be substantially at maximum intensity. As used herein, the terms "along the axis" and "contiguous to the axis" of the conduit is intended to include any loci within the main stream of flowing fluid, i.e., a loci where the flow rate of the fluid is significantly higher than the flow rate of the film of fluid along the wall of the conduit.

In the preferred embodiment of this invention, more fully discussed hereinafter, the energy wave front induced into the flowing fluid moves in cocurrent manner with the flow of fluid. However, it is within the total concept of this invention for the induced energy wave front to move in counter-current fashion with the flow of fluid to be metered in the conduit.

In the practice of this invention, the plural energy sensors referred to, preferably, include two sensing devices, such as thermistors, for the case where a thermal wave front is induced, having a distance $d_1$ between the two devices. Such a plural energy sensor is installed within the conduit along the wall thereof. In its broadest sense, the present invention also utilizes a second set of energy devices constructed similarly to the first devices described hereinabove, but placed in a position within the main stream of flowing fluid. This second plural energy sensor contains, for example, two additional thermistors having a distance $d_2$ between them. It is within the concept of this invention for the distance $d_1$ to equal $d_2$, $d_1$ to be greater than $d_2$, and $d_1$ to be less than $d_2$. Furthermore, the actual location of the nearest sensing device of the plural sensor to the energy inducing means for both plural sets may be the same or may be different. In a preferred embodiment of this invention, the distance of the sensing device or element closest to the energy inducing device is the same distance for both plural energy sensors. It is furthermore distinctly preferred that the distance $d_1$ be less than the distance $d_2$ as defined hereinabove.

The present invention is based upon the principle that the time required for the energy wave front to move the distance $d_2$ is dependent upon the flow rate of the fluid in the conduit and upon the conduction rate of the energy wave front in the flowing fluid. The principle also includes the concept that the time required for the energy wave front to move the distance $d_1$ (between the energy sensing devices along the wall) is dependent only upon the rate of energy transfer or conduction in the fluid, because the flow rate of the fluid at the wall of the conduit is theoretically zero or for all practical purposes can be considered zero.

Thus, the present flow metering system determines the time required for the energy wave front to move the distances $d_1$ and $d_2$. The output signal from this time determination is passed into readout means which represents the rate of flow of fluid.

The invention may be more fully understood with reference to the attached drawings wherein:

FIG. 1 is a schematic representation of the broad apparatus making-up the inventive flow metering system and indicates one placement of the various components relative to each other for one embodiment of the present invention; and, FIG. 2 is a schematic representation of preferred hardware for correlating the signals generated by the sensing devices with the flow rate of the fluid in the conduit.

Figure 1:
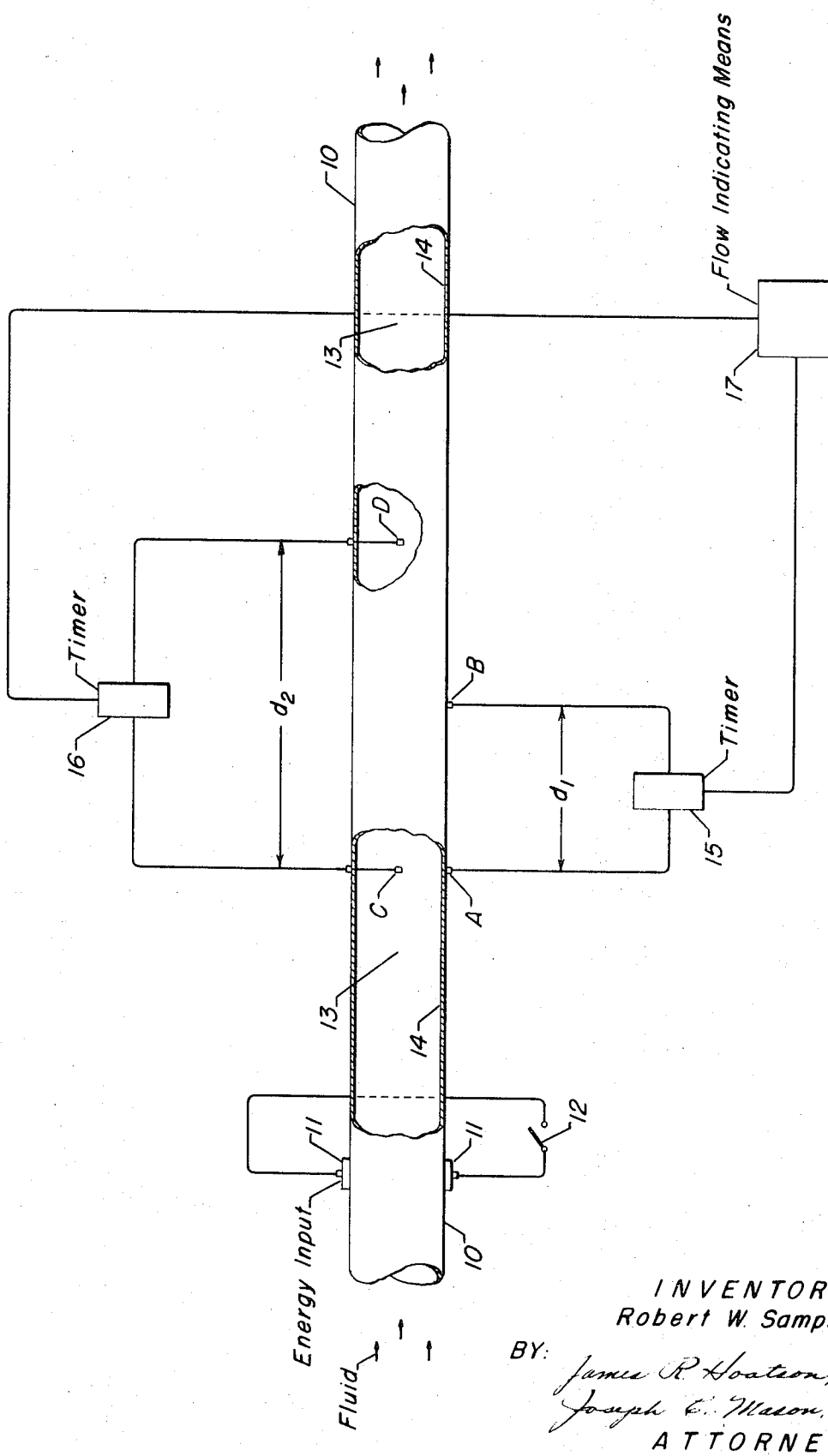
Referring now to FIG. 1, the flow metering system includes conduit 10, energy inducing means 11, energy source 12, sensing elements A and B spaced along the wall of conduit 10 at 14, sensing elements C and D spaced along the axis of conduit 10 at 13, timing device 15 cooperatively connected to sensing elements A and B, timing device 16 cooperatively connected to sensing elements C and D, and flow indicating means 17 for furnishing readout and display of the rate of flow as determined by signals generated by timing devices 15 and 16, respectively.

Broadly, operation of the flow metering system can be depicted as follows: a fluid to be measured, such as a hydrocarbon liquid, is introduced into conduit 10 in the flow direction shown by the arrows. A thermal wave front such as by electrical energy, is transmitted into the flowing fluid by energy input devices 11 which were activated by closing, for example, switch 12. The thermal wave front passes down conduit 10 and activates sensing elements A and C. The wave front continues and activates sensing elements B and D. Timing device 15 determines the time required for the thermal wave front to go the distance $d_1$. Timing device 16 determines the time for the same thermal energy wave front to go the distance $d_2$. Since the distance $d_1$ is, for all practical purposes, a measurement of the conductive factor for the thermal wave front in the fluid alone, and since the distance $d_2$ represents the time required for the energy wave front to move in accordance with the conductive properties of the fluid in addition to the relative velocity of the flowing fluid, the differential signal as determined by flow indicating means 17 is, therefore, a correlation of the rate of flow of the fluid.

Figure 2:
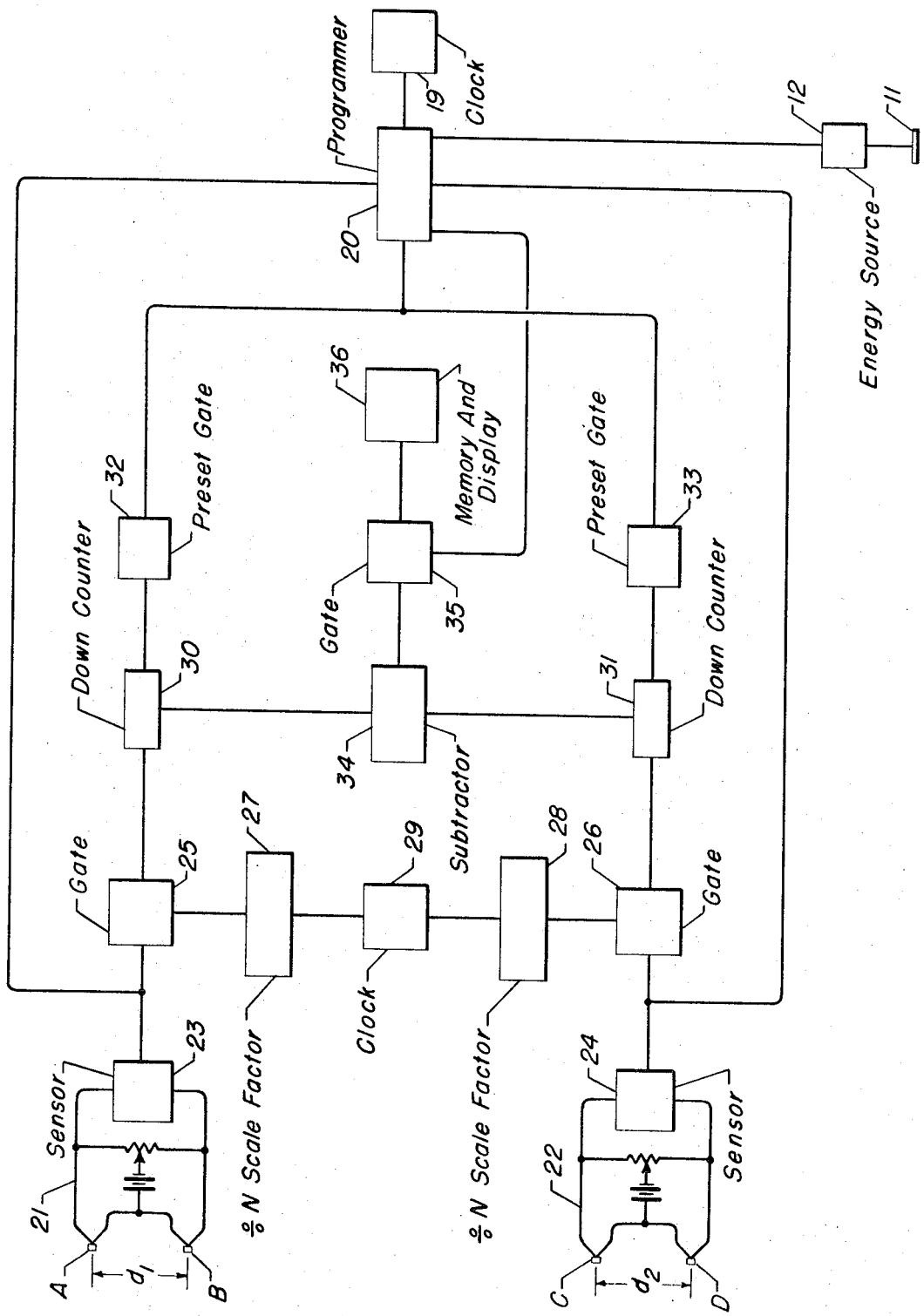

For a more specific representation of the preferred embodiment of this invention, reference is now made to FIG. 2 for an illustration of the preferred hardware in practicing the use of the flow metering system. Where applicable, the same numbers have been repeated in FIG. 2 as were used in FIG. 1. For example, the points A and B in FIG. 2 having distance $d_1$ therebetween represent the same points A and B having the distance $d_1$ as shown in the configuration of FIG. 1.

In brief, the apparatus shown in FIG. 2 includes programmer 20 which can be a timing device activated by clock 19; sensors 23 and 24 which may be polarity sensors connected across bridge circuits 21 and 22, respectively; diode AND gates 25, 26, 32, 33, and 35; frequency clock 29; counter 30 and 31 which may be an up-down counter; and, memory and display device 36.

Again, to illustrate the operation of the flow metering system as shown in FIG. 2, it is noted that A, B, C, and D sensors are connected to separate bridge circuits 21 and 22 whose output goes to, for example, polarity sensors 23 and 24, respectively. When the previously mentioned energy wave front activates sensor C, bridge circuit 22 will unbalance the gate 26 a fixed frequency clock 29 into counter 31 which is in the downcount mode and has been preset to a fixed number by gate 33. When the same energy wave front activates sensor D the bridge circuit 22 rebalances and inhibitis the clock gate. In similar fashion, sensors A and B through bridge circuit 21 and sensor 23 are controlling another clock gate 25–29 in the same manner as described for sensors C and D. The 25–29 clock gate sends a signal into counter 30 which is also in the downcount mode and has been preset to a fixed number by gate 32.

After completion of cycling of polarity sensors 23 and 24, programmer 20 transfers the number from subtractor 34, using transfer gate 35, into the display memory 36. Finally, programmer 20 presets counters 30 and 31 for the next flow determination.

Specifically, the preferred embodiment operates on the following cycle:

(1) Programmer 20 advances to $P_1$ and preset gates 32 and 33 set the down counters 30 and 31 to a predetermined number. This number is dependent on the flow conduit characteristics.

(2) Programmer 20 advances to $P_2$ and the energy source 12 fires. The energy wave front moves down the conduit and hits sensors A and C. This unbalances bridges 21 and 22 which activates gates 25 and 26 through sensors 23 and 24. Gates 25 and 26 allow a fix frequency to reach the down counters 30 and 31. The frequency which is used is controlled by the clock 29 and the ÷N scale factors 27 and 28. The frequencies used to downcount 30 and 31 are dependent on the distance used for $d_1$ and $d_2$ and the conduit characteristics.

The counters continue to downcount until the energy wave front hits sensors B and D. The programmer 20 will not advance until both sensors 23 and 24 indicate that the counting period is over for both downcounters 30 and 31.

The outputs of downcounters 30 and 31 are fed to subtractor 34 where the difference between the flow rates for $d_1$ and $d_2$ is taken. The subtraction process is taking place during the entire counting period which means a program step is not needed for this process.

(3) Programmer 20 advances to $P_3$ and activates gate 35 which transfers the output of subtractor 34 to the Memory and Display 36.

(4) Programmer 20 returns to $P_1$ and the cycle starts over.

Thus, it can be seen that the flow metering system of the present invention provides a digital readout which represents a number proportional to the flow rate of the fluid plus the conduction rate of the wave front in the fluid minus the conduction rate in the fluid. The final number is kept in the display memory 36 and updated with each flow determination.

As used herein, only the major functional components of the present flow metering system have been shown in as much as these can be assembled from commercially available circuits, such as diode AND gates, digital clocks, relay matrices, polarity sensors, and the like. The design of these subcomponents, per se, are well known to those skilled in the art and form no part of the present invention except as shown in combination in the drawings and in the appended claims. Furthermore, the term "conduit" is intended to embody any fluid carrier device, such as pipe or open trough arrangements.

PREFERRED EMBODIMENT

Therefore, from the presentation presented hereinabove. the preferred embodiment of the present invention provides an improved flow metering system comprising in combination a conduit for the passage of fluid therethrough; energy inducing means adapted to said conduit at an upstream loci; first dual energy sensors spaced downstream contiguous to the inner wall of said conduit having distance $d_1$ therebetween; second dual energy sensors spaced downstream contiguous to the axis of said conduit having distance $d_2$ therebetween; first polarity sensor for receiving signals from said first energy sensor; second polarity sensor for receiving signals from said second energy sensor; fixed frequency clock for receiving signals from both said first and second polarity sensors and for supplying a signal to counting means; and indicating means responsive to said counting means for representing flow of fluid in said conduit.

The inducement of energy into the conduit according to the practice of the present invention may be accomplished by any means known to those skilled in the art. It is within the concept of the present invention to utilize as energy inducing means infrared devices, ultraviolet devices, radio frequency waves, "glow" wire, ultrasonic sound waves, and the like.

Even though the flow metering system has been advantageously described for measuring the flow of a liquid fluid in a conduit, the metering system can also be adapted for the measurement of the flow of a gas.

The invention claimed:

1. A flow metering system for fluids of different compositions comprising, in combination, a conduit for the passage of fluid therethrough; a thermal energy inducing means attached to said conduit at an upstream loci; first dual energy sensors adapted to measure the conductive factor of said fluid spaced downstream contiguous to the inner wall of said conduit and having distance $d_1$ therebetween; second dual energy sensors spaced downstream contiguous to the axis of said conduit having distance $d_2$ therebetween; first polarity sensor for receiving signals from said first energy sensor; second polarity sensor for receiving signals from said second energy sensor; a fixed frequency clock for receiving signals from both said first and second polarity sensors and for supplying a signal to a counting means; and, indicating means responsive to said counting means for representing flow of fluid in said conduit, whereby a readout is obtained which represents a number proportional to the flow rate of the fluid plus the conduction rate of the wave front in the fluid minus the conduction rate in the fluid.

2. System according to claim 1 wherein $d_1$ is less than $d_2$.

References Cited

UNITED STATES PATENTS

| | | | |
|---|---|---|---|
| 2,603,089 | 7/1952 | Morley et al. | 73—204 |
| 2,776,565 | 1/1957 | Hudson | 73—204 |
| 3,349,614 | 10/1967 | Parker | 73—194 |

FOREIGN PATENTS 359,896  3/1962  Switzerland.

RICHARD C. QUEISSER, Primary Examiner

J. K. LUNSFORD, Assistant Examiner